United States Patent

Self

[15] 3,668,168
[45] June 6, 1972

[54] MOLDABLE METAL POWDER COMPOSITIONS CONTAINING AN ELASTOMER AND SILICA AQUASOLS

[72] Inventor: James M. Self, Wilmington, Del.
[73] Assignee: E. I. duPont de Nemours and Company, Wilmington, Del.
[22] Filed: Aug. 7, 1970
[21] Appl. No.: 62,144

Related U.S. Application Data

[63] Continuation-in-part of Ser. No. 18,345, Mar. 10, 1970, which is a continuation-in-part of Ser. No. 739,627, June 25, 1968, abandoned.

[52] U.S. Cl. ..............260/29.7 R, 106/83, 106/84, 260/29.6 S, 260/29.7 R
[51] Int. Cl. ................................C08d 7/06, C08d 7/14
[58] Field of Search ..............260/29.7 S, 29.7 R, 29.6 S; 29/192; 106/38.35, 84, 83, 94; 264/111

[56] References Cited

UNITED STATES PATENTS

| | | | |
|---|---|---|---|
| 3,024,125 | 3/1962 | Lee | 106/287 |
| 3,252,917 | 5/1966 | Mindick et al. | 252/313 S |
| 2,702,425 | 2/1955 | Thompson | 106/58 |
| 3,130,061 | 4/1964 | McMahon et al. | 106/287 |
| 3,385,345 | 5/1968 | Miraldi | 106/38.35 |

FOREIGN PATENTS OR APPLICATIONS

| | | | |
|---|---|---|---|
| 433,741 | 8/1935 | Great Britain | 106/83 |
| 38-16026 | 8/1963 | Japan | 106/94 |

*Primary Examiner*—Morris Liebman
*Assistant Examiner*—Richard Zaitlen
*Attorney*—Norbert F. Reinert

[57] ABSTRACT

Compositions of metal powder aggregate or metal powder aggregate/refractory mixtures, a siliceous binder, and an elastomeric material useful in the manufacture of metallic shapes or as a metallic filler compound.

7 Claims, No Drawings

MOLDABLE METAL POWDER COMPOSITIONS CONTAINING AN ELASTOMER AND SILICA AQUASOLS

CROSS-REFERENCE TO RELATED APPLICATIONS

This application is a continuation-in-part of my copending U.S. application Ser. No. 18,345, filed Mar. 10, 1970, which in turn is a continuation-in-part of U.S. application Ser. No. 739,627, filed June 25, 1968, now abandoned.

BACKGROUND OF THE INVENTION

This invention is directed toward compositions of metal powder aggregate or metal powder aggregate/refractory mixtures, a siliceous binder and an elastomeric material, and cured structures of the above composition.

Traditionally, the manufacture of metal articles has required the preparation of a die, the casting of molten metal into the die, and separation of the die from the formed metal object. This type of operation involves a substantial investment in specialized equipment and training of personnel, and therefore, has placed the manufacture of even simple metallic articles beyond the capacity of many smaller businesses.

This invention provides a composition which can be formed into metallic objects by relatively inexpensive and simple ceramic casting techniques. The elastomeric component of the composition will commmand-set when heated to its inversion temperature, thereby, permitting fast and efficient on-sight casting of metallic objects.

The elastomeric component of the composition, depending on its relative concentration, imparts a degree of flexibility to the cured composition which also makes it a highly useful filler compound for the repairing of auto body dents and rot.

SUMMARY OF THE INVENTION

In summary, this invention involves moldable compositions in which the binder component comprises at least 2 parts aqueous siliceous material selected from the group consisting of alkali stabilized colloidal silica sol having a particle size from 4 to 100 millimicrons, a pH of from 8.0 to 10.5 and from 10 to 60 weight percent $SiO_2$, a lithium stabilized colloidal silica sol having an average particle size of from 1 to 50 millimicrons, a pH of from 10.5 to 12.0, an $SiO_2:Li_2O$ mole ratio of from 4:1 to 25:1, from 1 to 25 weight percent solids, and a positively charged metal oxide coated colloidal silica sol having a particle size of from 4 to 15 millimicrons, a pH of from 3.0 to 6.0 and from 10 to 50 weight percent solids, of which 2 to 25 percent are basic metallic salts, and at least 2 parts elastomeric emulsion; and in which the aggregate materials comprise metal powder aggregates or metal powder aggregate/refractory mixtures, wherein the metal aggregate is selected from the group consisting of iron, copper, aluminum, their respective alloys and mixtures thereof.

This invention also involves cured articles prepared from the above compositions.

DESCRIPTION OF THE INVENTION a. Binder

The binder of the compositions of this invention consists essentially of two components; an inorganic siliceous material and an organic elastomeric material. The binder must contain at least 2 parts by weight of each of these two materials, based on the weight of the total composition.

The inorganic siliceous materials which can be used in the binder of the compositions of this invention are the alkali stabilized colloidal silica sols, the lithium stabilized colloidal silica sols, or the positively charged metal oxide coated colloidal silica sols.

The alkali stabilized colloidal silica sols which can be used in the compositions of this invention have a particle size of from 4 to 100 millimicrons, a pH of from 8.0 to 10.5 and from 10 to 60 percent solids by weight. The preparation and characteristics of these sols are more precisely described in Bechtold and Snyder U.S. Pat. No. 2,574,902; Rule, U.S. Pat. No. 2,577,485; and Alexander, U.S. Pat. No. 2,750,345.

A second class of colloidal silica sol of the compositions of this invention are the lithium stabilized sols which have an $SiO_2: Li_2O$ mole ratio of from 4:1 to 25:1, an average particle diameter ranging from 1 to 150 millimicrons, a pH of from 10.5 to 12.0 and from 1 to 25 percent solids by weight. The preparation and characteristics of these sols are more precisely described in Iler, U.S. Pat. No. 2,688,149.

A third class of colloidal silica sol of the compositions of this invention are the positively charged metal oxide coated sols which have a particle size of from 4 to 15 millimicrons, a pH of from 3.0 to 6.0 and from 10 to 50 percent solids by weight of which 2 to 25 percent are basic metallic salts. The preparation and characteristics of these sols are more precisely described in Alexander and Bolt, U.S. Pat. No. 3,007,878; Mundick and Reven, U.S. Pat. No. 3,139,406; and Mindick and Thompson, U.S. Pat. No. 3,252,917.

The preferred metal oxide coated silica sol of this invention are the alumina coated sols, prepared by the method described by Alexander and Bolt in their patented process.

The organic elastomeric materials which can be used in the binder of the compositions of this invention are preferably in the form of a latex emulsion.

Conventional latex emulsions of the elastomeric materials usually comprise small globules of elastomer suspended in a fluid medium, ordinarily water. Standard emulsions also routinely contain other materials such as an initiator (catalyst) and an emulsifier.

The solids content of a typical latex emulsion of the binder of the composition of this invention can range from a low of 25 to a high of 65 weight percent. Most commercial grades of latex emulsion contain from 45 to 65 percent solids, which is essentially the percentage of elastomer in the emulsion.

Elastomeric materials of the type which can be formulated with the siliceous colloids in the binder component of the uncured compositions of this invention are 2-chloro-1,3-butadiene, 2,3-dichloro-1,3-butadiene, described in U.S. Pats. Nos. 2,914,497 and 3,082,262; chlorinated sulfonated polymers of ethylene, described in U.S. Pat. No. 2,586,363; fluoroelastomers, described in U.S. Pat. Nos. 3,051,677 and 2,968,649; and urethane polymers, described in U.S. Pat. No. 3,133,853.

The ratio of these two components of the binder can range from 1 to 5 parts siliceous materials to 1 to 5 parts elastomer.

Binders containing an equal amount of alkali stabilized colloidal silica sol and the benzene soluble polymer of 2-chloro-1,3-butadiene or 2,3-dichloro-1,3-butadiene (neoprene polymers) appear to give the most satisfactory results and are preferred for the compositions of this invention.

b. Aggregate

1. Metals

The metals which can be used in the aggregate portion of the compositions of this invention are iron, copper, aluminum, their respective alloys or mixtures thereof.

An "alloy" of one of the metals used in the composition of this invention comprises an intimate admixture of at least two or more metals containing at least 50 weight percent of one of the above metals.

The preferred metals of the aggregates of the compositions are the stainless steels and aluminum.

The particle size of the metal aggregate will directly affect the strength and texture of the surface of the cured articles prepared from this composition, and therefore, for practical and aesthetic considerations, should not exceed 250 microns.

The very fine metal aggregates, commonly referred to as "-flours," are preferred in situations where the composition is to be used to produce articles where a very fine surface is required. Refractory materials are usually added to the aggregate mass as a substitute for the more expensive metal powders. The concentration of the refractory in the aggregate mass cannot equal or exceed the amount of metal powder in the aggregate without adversely affecting the metallic qualities of the composition.

Fibrous refractories which can be used in the aggregate mass are mineral wool (Baldwin-Ehret-Hill, Inc.), aluminosilicate ceramic fibers (Carborundum Co.), asbestos (Johns-Mansville), paper pulp, and glass wool (Owens-Corning Fiberglass Corp.).

Particulate refractories which can be used in the aggregate gate mass are perlite (Coralux Perlite Corp. of New Jersey, Inc.), amorphous silica (Harbison-Walker Refractories Co.), vermiculite (W. R. Grace & Co., Zonolite Div.), expanded refractory clay aggregates (Mapleton Development, Inc.), hollow ceramic spheres (Dierks Forests, Inc.), pigmentary potassium titanate (E. I. du Pont de Nemours and Company, Inc.), vitreous or fused silica, zirconia, refractory alumina, mullite, molokite, and Calamo (Harbison-Walker Refractories Co.).

The limitations on metal particle size previously discussed also apply to the refractories.

COMPOSITION FORMULATION

The compositions of this invention are prepared by mixing 4 to 8 parts binder with 82 to 96 parts finely divided aggregate until the mixtures appear uniformly blended. Depending upon the degree of fluidity of the mixture it can be poured or trowelled into a mold or a cavity.

After the composition is in place, the temperature of its environment is slowly raised to permit uniform heat-through. At or about 250° F., the elastomeric component of the binder will reach its inversion temperature, and coagulate, thereby command-setting the composition mass. After setting, the composition can be removed from its mold, if desired, and further cured by heating to a temperature just below the decomposition point of the organic elastomer.

The time required to set and cure the composition will depend primarily upon the shape and thickness of the green mass, the amount of binder, and the amount of metal aggregate present in the composition, although these are not the only factors which can effect duration of curing.

After the composition is cured, it is cooled and removed from its mold. The cured compositions of this invention can be sanded, machined, drilled and otherwise worked like any other low temperature materials.

The elastomeric material of the binder also serves to insulate or inhibit those of the more reactive metals of the aggregate, those above hydrogen in the electromotive series of elements, from reaction with the caustic and acidic siliceous materials of the binder.

For example, amphoteric materials, such as aluminum, when not so inhibited, will react with both acidic and caustic siliceous materials, causing foaming and premature gelation of the siliceous component of the binder.

Stainless steels do not noticeably react with any of the binder components of the compositions of this invention even when not so inhibited and are the most preferred of all the metals of the aggregate.

The concentration of the elastomer in the binder can therefore be adjusted in such a way as to directly affect the density of the finished composition.

Where enhancement of the inherent strength of the composition is desired, reinforcing filler materials can be added to the composition, or the composition can be cast in layers to form a laminate.

The reinforcing filler materials which can be embedded in the unset compositions of this invention may be in the form of strands, rovings, mat or woven materials of aluminum, copper, fiberglass, aluminum silicate, ceramic fibers, asbestos, or heavy metal oxides of zirconium, titanium or hafnium.

Lamination of the composition of this invention can be accomplished by independently casting and setting at least two layers of the composition so that each has one surface in contact with the other. The separate layers are then integrally bonded to one another during the further curing of the compositions at the more elevated temperatures.

Ordinarily, the individual layers of the laminate will be of approximately the same thickness and rarely exceed an independent depth of one-fourth inch. The number of layers in a laminate can vary, and the total thickness of such laminate is only limited by the same practical and technical limitations placed on the formation of non-laminated articles.

The surface of the cured article may occassionally dry powdery and/or otherwise irregular. To remedy such malformations, a thin ceramic glaze of the siliceous material of the binder of the composition of this invention can be applied to the finished article by conventional coating techniques. The glaze is cured by heating the coated article as before.

The examples which follow provide a number of specific embodiments of the disclosure of this invention.

Parts and percentages, where used in the examples, are by weight unless otherwise stipulated.

EXAMPLE 1

The iron powder has the following properties: average mesh size, less than 1 percent on 200 mesh, 85 percent through 325 mesh. Average particle diameter approximately 18 microns. Approximate specific gravity—7.2, average apparent density—3.5.

The alkali-stabilized silica sol portion of the binder has a particle size from 4 millimicrons to 100 millimicrons. The pH is 8–10.5 and the sol is approximately 40 percent solids (material is described in U. S. Pats. Nos. 2,574,902; 2,577,485; and 2,750,345).

The latex emulsion portion of the binder comprises a carboxylic modified styrene/butadiene polymer, having a particle size of approximately 2,500 A, a monomer ratio of 67/33, a pH of 9.0, and a total solids content of 56 percent (Pliolite Resin Latex 480—Chemical Division of Goodyear Tire and Rubber Company).

A slurry of 200 parts of iron powder is mixed with 14 parts of alkali-stabilized silica sol (40 percent solids) and 14 parts of latex emulsion (56 percent solids) to form a slip. The material is then poured into a metal cavity 4 × 2 × ¼ inches. The slip is set by heating for 5 minutes at 70° C. then 5 minutes at 110° C. The set slip can be sanded and painted much like a metal. the modulus of rupture and compressive strength of the cured slip are respectively 2,000–3,000 psi and 5,000 to 6,000 psi.

EXAMPLE 2

Two hundred parts of -325 mesh 316L stainless steel powder is blended with 13 parts of alkali stabilized silica sol (described in Example 1) and 14 parts of latex emulsion (described in Example 1) to form a slip. The slip is cast into a mold 4 × 2 × ¼ inches and dried at room temperature for 18 hours. The modulus of rupture and compressive strength of the dried shapes are respectively 1,000–1,500 psi and 2,000–3,000 psi.

EXAMPLE 3

Two hundred parts of -325 mesh 316L stainless steel powder was blended with 12.2 parts acid stabilized alumina coated silica sol (4-50 m$\mu$particle diameter; pH of 3–6; 30 percent total solids) and 12.5 parts of a positively charged latex emulsion having a a chloroprene polymer containing a cationic emulsifier and having a particle size of approximately 1,200 A, a latex/polymer Sp. Gr. of 1.10/1.23, a pH of 9.0 (fresh) and a total solids content of approximately 50 percent (Latex 950—E. I. du Pont de Nemours and Company) to form a slip. The slip was cast into a mold 4 × 2 × ¼ inches and dried at room temperature for 18 hours. The modulus of rupture and compressive strength of the dried shape are respectively 800–1,000 psi and 1,500–2,000 psi.

EXAMPLE 4

Two hundred parts of -325 mesh 316L stainless steel powder was blended with 12.5 parts high ratio lithium silicate ($SiO_2$:$LiO_2$ ratio 4.8; pH of 10.5–12; average particle diameter of 1–150 m$\mu$) and 12.7 parts of latex emulsion and 12.7 parts of a latex emulsion comprising a chloroprene polymer having a particle size approximately 1,200 A, a latex/polymer Sp. Gr. of 1.12/1.23, a pH of 11.0 (fresh), and a total solids content of approximately 58 percent (Latex 635—E. I. du Pont de Nemours and Company) to form a slip. The slip was cast into a mold 4 × 2 × ¼ inches and dried at room temperature for 18 hours. The modulus of rupture and compressive strength of the dried shape are respectively 700–1,000 psi and 1,400–1,800 psi.

EXAMPLE 5

One hundred and fifty parts of an aluminum powder (50 percent by weight Alcoa 115 and 50 percent by weight Valimet 818) was blended with 9 parts acid stabilized alumina coated silica sol (described in Example 3) and 9 parts of latex emulsion (described in Example 3) to form a slip. The slip was cast into a mold 4 × 2 × ¼ inches and dried at room temperature for 18 hours. The modulus of rupture and compressive strength of the dried shape are respectively 2,000–2,500 psi and 4,000–5,000 psi.

EXAMPLE 6

Two hundred parts of iron powder (described in Example 1) was blended with 12.7 parts of high ratio lithium silicate (Described in Example 4) and 12.2 parts of latex emulsion (described in Example 4) to form a slip. The slip was cast into a mold 4 × 2 × ¼ inches and dried at room temperature for 18 hours. The modulus of rupture and compressive strength of the dried shape are respectively 800–1,000 psi and 1,500–1,800 psi.

What is claimed is:

1. A moldable metallic composition consisting essentially of 4 to 18 parts binder and 82 to 96 parts aggregate,
    wherein said binder has
    a. at least 2 parts by weight, based on the weight of the total composition, silica aquasol selected from the group consisting of
      1. an alkali stabilized colloidal silica aquasol having a particle size of from 4 to 100 millimicrons, a pH of from 8.0 to 10.5 and from 10 to 60 weight percent solids,
      2. a lithium stabilized colloidal silica aquasol having a $SiO_2:Li_2$ mole ratio of from 4:1 to 25:1 an average particle diameter ranging from 1 to 150 millimicrons, a pH of from 10.5 to 12.0 and 1 to 25 weight percent solids, and
      3. a positively charged metal oxide coating colloidal silica aquasol having a particle size of from 4 to 15 millimicrons, a pH of from 3.0 to 6.0 and from 10 to 50 weight percent solids; and
    b. at least 2 parts by weight, based on the weight of the total composition, a latex emulsion of an elastomeric material present in the amount of 25–65 weight percent of the emulsion; and
wherein said aggregate consists essentially of metal powder aggregates or metal powder aggregate/refractory mixtures, the metal powder aggregate being selected from the group consisting of iron, copper, aluminum, their respective alloys and mixtures thereof and the metal powder aggregate/refractory mixtures containing a major amount of metal powder and a minor amount of refractory.

2. The moldable metallic composition of claim 1, wherein the metal powder aggregate is iron or stainless steel.

3. The moldable metallic composition of claim 1, wherein the silica aquasol of the binder is an alkali stabilized colloidal silica aquasol.

4. The moldable metallic composition of claim 1, wherein the elastomeric material of the binder is a chloroprene polymer emulsion wherein said emulsion has polymer particles of approximately 1,200 A, an emulsion/polymer specific gravity of approximately 1.10/1,23, a pH of from 9.0 to 11.0 and solids content of 50 to 60 weight percent.

5. An article of the cured composition of claim 1.

6. A laminated article comprising independently set and integrally bonded layers of the cured composition of claim 5.

7. A reinforced composition of claim 1, wherein reinforcing materials are embedded in said composition.

* * * * *